(12) United States Patent
Hedström

(10) Patent No.: US 7,241,241 B2
(45) Date of Patent: Jul. 10, 2007

(54) DEVICE FOR SETTING A DIRECTION

(75) Inventor: Hans Hedström, Stockholm (SE)

(73) Assignee: Digatech AB, Stockholm (SE)

( * ) Notice: Subject to any disclaimer, the term of this patent is extended or adjusted under 35 U.S.C. 154(b) by 115 days.

(21) Appl. No.: 10/505,890

(22) PCT Filed: Mar. 25, 2003

(86) PCT No.: PCT/SE03/00488

§ 371 (c)(1),
(2), (4) Date: Sep. 8, 2004

(87) PCT Pub. No.: WO03/081082

PCT Pub. Date: Oct. 2, 2003

(65) Prior Publication Data

US 2005/0119078 A1   Jun. 2, 2005

(30) Foreign Application Priority Data

Mar. 27, 2002 (SE) ................................... 0200947

(51) Int. Cl.
*F16H 7/12* (2006.01)
(52) U.S. Cl. ........................ 474/134; 474/135
(58) Field of Classification Search ............... 474/101, 474/109, 110, 111, 112, 140, 141, 148, 150, 474/134, 135; 33/1 PT
See application file for complete search history.

(56) References Cited

U.S. PATENT DOCUMENTS

| | | | | |
|---|---|---|---|---|
| 3,625,406 A * | 12/1971 | Campbell | ............... | 226/55 |
| 4,966,571 A * | 10/1990 | de Guillebon | ............... | 474/111 |
| 5,419,742 A * | 5/1995 | Shimaya | ............... | 474/112 |
| 5,475,930 A | 12/1995 | Kimura | | |
| 5,689,892 A | 11/1997 | Beckingham | | |
| 5,784,932 A * | 7/1998 | Gilberti | ............... | 74/813 R |
| 5,794,757 A * | 8/1998 | Svejkovsky et al. | ...... | 198/750.8 |
| 5,959,222 A * | 9/1999 | Poole | ............... | 73/866 |
| 6,321,052 B1 * | 11/2001 | Yamashina et al. | ......... | 399/165 |
| 6,336,881 B1 * | 1/2002 | Rapp et al. | ............... | 474/111 |
| 6,418,629 B1 * | 7/2002 | Oh | ............... | 33/1 PT |
| 6,503,163 B1 * | 1/2003 | Van Sant et al. | ........... | 474/101 |

(Continued)

FOREIGN PATENT DOCUMENTS

DE  199 34 931  7/1999

(Continued)

*Primary Examiner*—Richard Ridley
*Assistant Examiner*—Terence Boes
(74) *Attorney, Agent, or Firm*—Jacobson Holman PLLC

(57) ABSTRACT

A direction setting device has a frame and a rotatably mounted shaft which supports a first belt pulley whose rotational position defines a direction to be set. A rotary motor on the frame supports a second belt pulley, and an endless belt extends around the first and second pulleys. A deflecting device deflects a second part of the belt while the motor is stationary at a set position of rotation, so as to change the effective length of the second part of the belt. A resilient tensioning device changes the length of the a first part of the belt to compensate for the change in length of the second part of the belt. This enables the first pulley to be turned through an angle that is dependent on the deflection of the second part of the belt by the deflecting device.

15 Claims, 2 Drawing Sheets

U.S. PATENT DOCUMENTS

| | | |
|---|---|---|
| 6,643,940 B1 | 11/2003 | Donath et al. |
| 6,817,328 B2 * | 11/2004 | Buglione et al. ...... 123/179.25 |
| 2002/0144422 A1 * | 10/2002 | Suhara et al. ............. 33/613 |
| 2004/0053719 A1 * | 3/2004 | Gibson ..................... 474/112 |
| 2004/0162700 A1 * | 8/2004 | Rosenberg et al. ......... 702/168 |

FOREIGN PATENT DOCUMENTS

WO   87/07366   12/1987

* cited by examiner

DEVICE FOR SETTING A DIRECTION

This is a nationalization of PCT/SE03/00488 filed Mar. 25, 2003 and published in English.

BACKGROUND OF THE INVENTION

1. Field of the Invention

The present invention relates to a directional alignment device or direction setting device. The device includes a frame having a rotatably mounted shaft which supports a first belt pulley whose rotational position defines a direction to be set, a rotary motor on the frame that supports a second belt pulley, and an endless belt that extends around the first and second belt pulleys.

2. Description of the Prior Art

There is a need to be able to bring, for instance, optical instruments into a precise position of alignment, such as to bring a laser beam into a precise position of alignment with a given subject. For example, two such laser units that have well known relative positions are able to provide accurate marking of a position with the aid of their mutually intersecting laser beams.

A first requirement is that the device is able to effect this alignment quickly. A second requirement is that the alignment can be achieved with great precision. A third requirement is that the device can be produced at low cost.

These requirements are not normally compatible with one another.

The concept of the invention is based on the use of a rotary stepping motor. Such motors are available commercially and have an angular stepping increment of about 1°. Rotary stepping motors that have finer resolutions are much more expensive. However, even if it were possible to obtain a rotary stepping motor of desired high resolution, say a resolution of 0.001°, with or without gearing, the time taken to rotate the stepping motor through one half of a revolution would be unacceptably long. However, it is possible in principle to improve the angular resolution of a rotary stepping motor, by coupling the motor to a gear or pulley transmission means. For example, the stepping motor may be fitted with a small belt pulley that is connected to a pulley which is ten times its size, by means of an endless belt, wherein the angular step or increment made by the larger pulley will be correspondingly smaller, e.g. in the order of 0.1° instead of 1°. However, as before mentioned the time taken to achieve the necessary higher angular resolutions is unacceptable.

Accordingly, the object of the invention is to provide a modified version of said device with which alignment or a positional setting can be effected in the correct direction with great precision and within a short space of time.

This object is achieved with the present invention.

SUMMARY OF THE INVENTION

The invention includes a frame having a rotatably mounted shaft which supports a first belt pulley whose rotational position defines a direction to be set, a rotary motor on the frame that supports a second belt pulley, and an endless belt that extends around the first and second belt pulleys. A deflecting device serves to deflect a first part of the belt while the motor is stationary at a set position of rotation, so as to change an effective length of the first part of the belt. A resilient tensioning device serves to change a length of a second part of the belt to compensate for the change in the effective length of the first part of the belt. This enables the first belt pulley to be turned through an angle dependent on the deflection of the first part of the belt by the deflecting device.

Further embodiments of the invention are made apparent in the accompanying dependent claims.

According to one preferred embodiment of the invention there is used an endless belt which extends around a small circular pulley connected to a stepping motor and around a larger rotatable pulley whose position of rotation defines the direction to be set.

It is preferred that the belt is essentially incapable of being stretched, that the pulleys are rigid, that the belt is very stiff in the direction of its thickness, and that the pulleys are at a fixed distance apart. In such situations it is, of course, necessary to provide a separate resilient or springy member that will deflect and tension the first part of the belt.

The belt is placed around the pulleys with a pre-determined amount of slack. This slack is taken up by deflection of the first part of the belt between the pulleys by means of resilient tensioning means, so as to keep the belt tensioned, i.e. so as to eliminate the slack. The, second part of the belt is deflected by means of a displacement body with associated drive means. The stepping motor lies fixed at an increment of rotation, so that the small pulley will lie fixed and so that the belt will be fixed relative to the small pulley. As the length of the second part of the belt increases in response to an increase in its the deflection, the larger belt pulley is forced to rotate to a corresponding degree. However, because the length of the first part of the belt will decrease, it is necessary to make compensation at said first belt part. This compensation is achieved by deforming the spring, so as reduce the extent of the deflection of the first belt part. As before mentioned, this will result in rotation of the larger belt pulley through a correspondingly small angle from a rough setting position or position of alignment set by the stepping motor.

In respect of the second part of the belt, the maximum deflection is conveniently chosen so as to correspond to one increment of angular rotation established by one step of the stepping motor. For example, deflection of the second part of the belt can be achieved with the aid of an eccentric that can rotate through one half of a revolution, for instance by means of a rotatable stepping motor, which may be of the same design as the stepping motor connected to the small belt pulley. The eccentric may carry a peripheral ring in the form of a ball bearing, so that rotation of the eccentric will not result in length displacement of said belt part.

For example, it is possible to achieve with practical embodiments of the invention that include a primary stepping motor which provides a stepping length or increment of 1° a stepping length of 0.1° in respect of the larger belt pulley via said transmission, wherewith deflection of the first belt part by means of the eccentric results in a directional precision of e.g. 0.001° in respect of said larger pulley. It will be seen that the fine adjustment afforded by the eccentric in the illustrated case extends the time taken to achieve this directional setting via the belt and the belt pulleys by 10% (about 1:10)

It is also conceivable, however, to use a belt that can be stretched elastically in its length direction, or a belt that can be compressed elastically in its thickness direction against the belt pulleys, or to allow the frame of the device to yield elastically so as to enable the distance between the pulley shafts to be varied in accordance with belt tension, or for the pulleys to be deformable elastically in a radial direction. Such elastic deformation options could provide a function corresponding to the function afforded by said resilient or springy deflecting element in respect of the first part of the belt. These options can therefore be considered as technical equivalents to a separate spring-biased deflecting element with regard to the first part of the belt when the belt cannot be stretched and the device is rigid in other respects.

Naturally, technically equivalent devices such as chains, chain pulleys, lines and line pulleys can also be used in the place of belts and belt pulleys. It will be understood, however, that reference to belts and belt pulleys shall include such alternatives within the scope of the present invention.

As will be understood, it is possible to use other types of motor than a stepping motor, such as DC-rotary motors for instance, with or without gears. In this regard it is possible, e.g., to create a characteristic for the type of motor concerned so that a relationship can be established between an operating parameter, for instance activation time, and angle of rotation, thereby enabling a direction to be set roughly and then finely via said operating time parameter in accordance with the principles of the invention. However, an angle sensor is normally connected to the direction indicating axis of the device. Such angle sensors are available commercially relatively cheaply and have a high resolution, therewith enabling the angle sensor to be used to show that the rough adjustment has been carried out within predetermined limit values. It is possible to collect an output signal from the sensor so that it can be used together with the desired direction to be set and therewith obtain the most precise rough alignment or directional setting of the device possible with respect to the motor and then the most precise fine setting or alignment of the device with respect to the properties of the motor concerned. A control computer for setting the device in a desired direction can receive a reference signal from the angle sensor. The control computer may, of course, include standard computing elements which function to send appropriate control signals to the motors on the basis of an inputted desired direction of said device.

It may be possible to exclude the angle sensor when using stepping motors, since hopefully there will be found a strict relationship between the number of drive pulses (and driving direction) for respective motors on the one hand and the set direction on the other hand. Naturally, the direction indicating element may carry a sensor that detects a target in a specific absolute direction or position relative to the position of the device so as enable the device and its angle sensor to be readily calibrated.

BRIEF DESCRIPTION OF THE DRAWINGS

The invention will now be defined by way of example with reference to the accompanying drawings, in which.

DETAILED DESCRIPTION OF THE PREFERRED EMBODIMENTS

Figure 1:
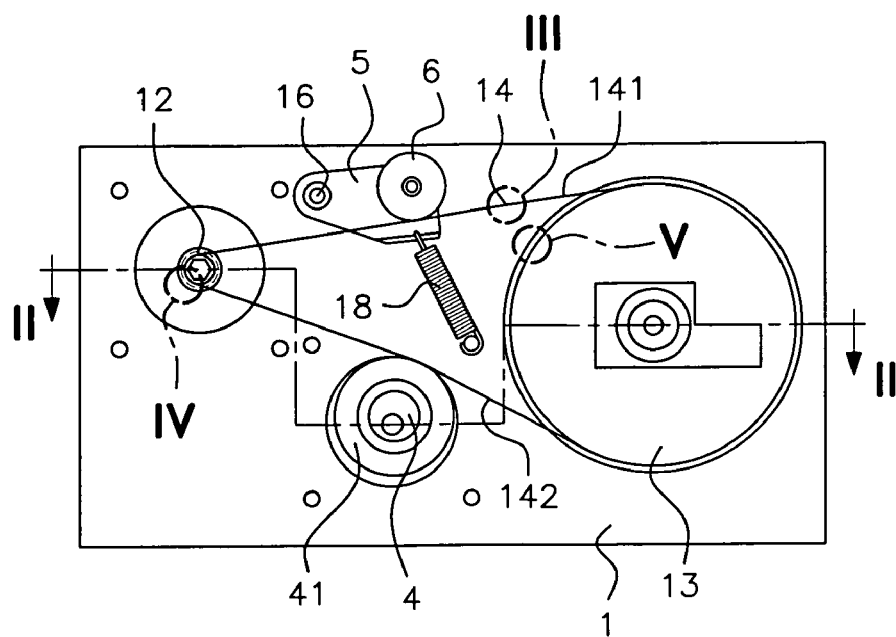
FIG. 1 is a plan view of the inventive device.
Figure 2:
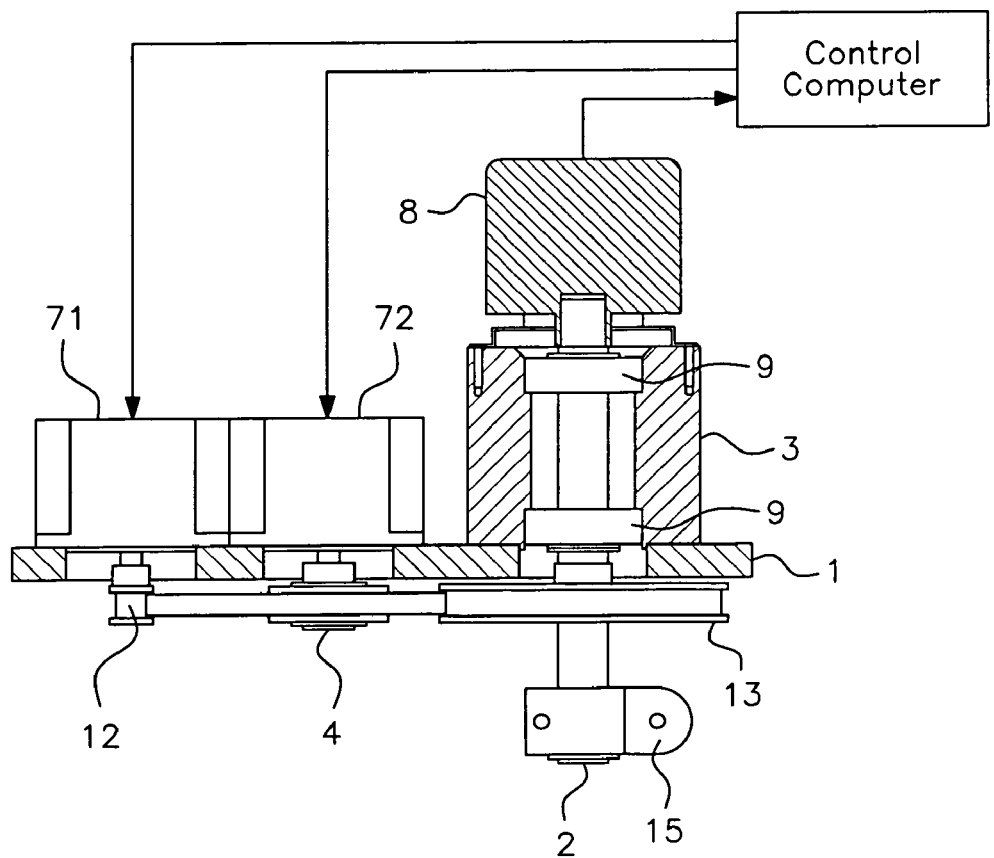
FIG. 2 is a schematic sectional view taken on the line II-II in FIG. 1.
Figure 3:
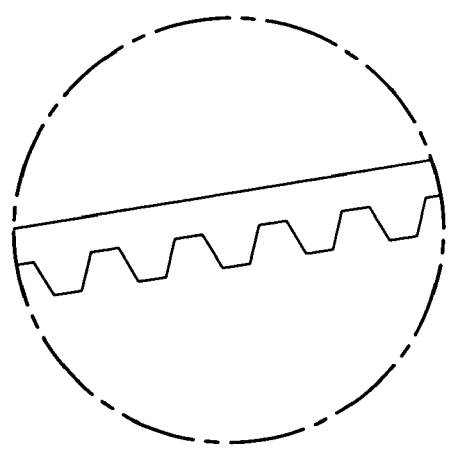
FIG. 3 is a detailed view of a toothed belt illustrated in FIG. 1.
Figure 4:
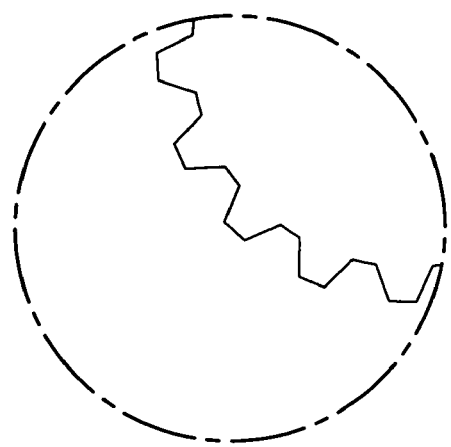
FIG. 4 is a detailed view of a toothed pulley illustrated in FIG. 1
Figure 5:
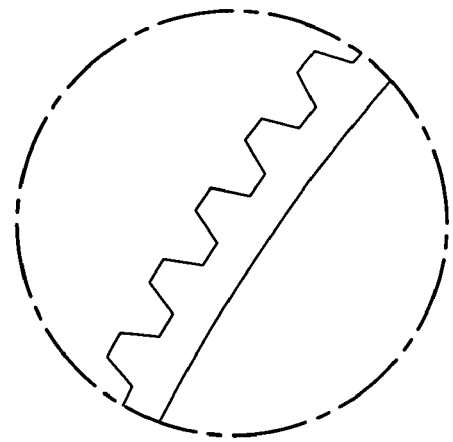
FIG. 5 is a detailed view of another toothed pulley illustrated in FIG. 1.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The device comprises a frame plate 1 that carries a rotary stepping motor 71 whose shaft supports a first belt pulley 12. The plate 1 also carries a bearing housing 3 which houses two separate bearings 9 for a shaft 2 which, in turn, supports a larger second pulley 13 whose diameter can be ten times larger than the diameter of the first pulley 12. A belt 14 extends around the pulleys 12, 13. The length of the belt 14 is slightly greater than the shortest belt path around the pulleys 12, 13. A first part 141 of the belt is deflected in the plane of a tensioning roller 6 which is carried by a pivotal arm 5 pivotally mounted on a pivot shaft 16 at a distance from the roller 6 along the first part of the belt 141. A tensioning spring 18 tensions the arm 5 and thus biases the roller 6 against the belt part 141, therewith holding the endless belt 14 in tension. The second part 142 of the belt 14 runs in contact with a ball bearing 41 mounted on an eccentric 4 carried by a rotary stepping motor. The eccentric 4 is designed to provide varying deflection of the second part 142 of the belt. The belt 14 is a toothed belt and the pulleys 12, 13 are preferably toothed pulleys. The spacing between the pulleys is essentially constant. The shaft 2 of the pulley 13 carries an attachment 15 for accommodation of a laser unit whose direction shall be set. The shaft 2 is coupled to an angle sensor B which reads-off the angle of rotation of the shaft 2, i.e. the direction of the attachment 15.

The attachment 15 can be turned through a chosen angle, by driving the stepping motor 71 with a specific number of drive pulses so as to impart a corresponding angle of rotation to the pulley 12, this angle being translated by the transmission means 12, 13, 14 to the angle through which the pulley 13 and thus also the shaft 2 and the attachment 15 shall be rotated. When the stepping motor has a stepping length or increment of 1° and the transmission means has a transmission ratio of 1:1°, the pulley 13 can be caused to rotate through an angle of precisely 0.1°. The eccentric is designed to produce between its end positions a deflection of the belt part 142 that corresponds to rotation of the pulley 13 through an angle of 0.1°, i.e. through an angle corresponding to a pulley stepping increment as driven by the stepping motor 71. If the eccentric 4 is rotated by a further stepping motor 72 that also has a stepping increment of 1°, rotation of the eccentric through 180° will correspond to 180 increments. This means that each step of the motor 72 will correspond essentially to rotation of the belt pulley 13 through an angle of 0.1°: 180, i.e. the pulley 13 and therewith the attachment 15 will obtain on average a setting accuracy in excess of 1.001°.

When the stepping motor 71 can be driven in both directions, a maximum rotation of five full revolutions will be required of the motor 71 in order to achieve a rough directional setting. A fine directional adjustment with the aid of the eccentric 4 will then require one half of a revolution of the e-f stepping motor 72. The time taken to improve the setting precision of the stepping motor by a factor of 10 via the transmission means 12, 13, 14 need only be increased by 10 percent in order to achieve an increase in directional precision by a factor in excess of 100, i.e. a directional precision greater than 0.001°.

Deflection of the part 142 of the belt by means of the eccentric results in an increase in the length of said belt part. This increase is compensated for by decreasing the length of the part 141 of the belt, which is effected by displacement of the tensioning roller 6 while deforming the spring 18, therewith allowing the pulley to rotate. This ability of the pulley 13 to rotate while the pulley 12 is stationary and firmly holds the adjacent part of the belt, continues suitably to an angle of rotation corresponding to that produced by one rotational increment of the stepping motor 71.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A direction setting device comprising:
    a frame having a rotatably mounted shaft which supports a first pulley whose rotational position defines a direction to be set;
    a rotary motor disposed on the frame that supports a second pulley;
    an endless belt that extends around the first and second pulleys;
    a deflecting device which deflects a second part of the belt while the motor is stationary at a set position of rotation, so as to change an effective length of the second part of the belt; and
    a resilient tensioning device which changes a length of a first part of the belt to compensate for the change in the effective length of the second part of the belt to enable the first pulley to be turned through an angle dependent on the deflection of the second part of the belt by the deflecting device.

2. The device according to claim 1, wherein the belt is substantially non-stretchable, and the tensioning device includes a spring actuated tensioning body which acts against the first part of the belt substantially in a cross direction of the belt.

3. The device according to claim 1, wherein the tensioning device is elastically yieldable with respect to the belt in a belt thickness direction, is elastically yieldable with respect to the belt in a belt longitudinal direction, and is elastically yieldable with respect to a location of one of the pulleys in a radial direction of the pulleys.

4. The device according to claim 1, wherein the belt is a toothed belt and one of the pulleys is a toothed pulley.

5. The device according to claim 1, wherein the deflecting device enables rotation of the first pulley through an angle corresponding to a rotational increment angle of the rotary motor driving the second pulley.

6. The device according to claim 5, wherein the second pulley rotary motor is a stepping motor.

7. The device according to claim 1, wherein the deflecting device includes a rotatably driven eccentric.

8. The device according to claim 7, wherein the eccentric has a peripheral surface that includes a rotatably mounted ring rotatably carried by the eccentric.

9. The device according to claim 7, wherein the eccentric is driven by a rotary stepping motor.

10. The device according to claim 9, further comprising an angle sensor coupled to the shaft of the first pulley.

11. The device according to claim 10, further comprising a control computer to control the second pulley motor to within a chosen trial setting tolerance and to control the eccentric motor to within a chosen fine setting tolerance.

12. The device according to claim 11, wherein the angle sensor sends a control signal to the control computer, and said control computer inputs the direction to be set.

13. A direction setting device comprising:
    a frame having a rotatably mounted shaft that supports a first pulley whose rotational position defines a direction to be set;
    a rotary motor disposed on the frame that supports a second belt pulley;
    a belt that extends around the first and second pulleys;
    a deflecting device that deflects a second part of the belt while the rotary motor is stationary at a set position of rotation, so as to change a length of the second part of the belt, and that enables rotation of the first pulley through an angle corresponding to a rotational increment angle of the rotary motor driving the second pulley; and
    a tensioning device that changes a length of a first part of the belt to compensate for the change in the length of the second part of the belt, so as to enable the first pulley to rotate through an angle based on the deflection of the second part of the belt.

14. The direction setting device according to claim 13, wherein the deflecting device includes an eccentric driven by a rotary stepping motor.

15. The direction setting device according to claim 13, wherein the second pulley rotary motor is a stepping motor.

* * * * *